United States Patent [19]
Madigan, Jr. et al.

[11] Patent Number: 5,844,221
[45] Date of Patent: Dec. 1, 1998

[54] METHOD AND SYSTEM FOR REDEEMING COUPONS

[75] Inventors: Edwin F. Madigan, Jr., Auburn; Christi A. Ruberti, Lawrenceville, both of Ga.

[73] Assignee: NCR Corporation, Dayton, Ohio

[21] Appl. No.: 821,987

[22] Filed: Mar. 21, 1997

[51] Int. Cl.⁶ .................................................. G06K 15/00
[52] U.S. Cl. .......................................... 235/383; 235/375
[58] Field of Search ................................. 235/383, 375, 235/492; 364/401

[56] References Cited

U.S. PATENT DOCUMENTS

| | | | |
|---|---|---|---|
| Re. 35,117 | 12/1995 | Rando et al. | 235/375 |
| 4,839,507 | 6/1989 | May | 235/381 |
| 5,008,519 | 4/1991 | Cunningham et al. | 235/383 |
| 5,091,634 | 2/1992 | Finch et al. | 235/375 |
| 5,128,520 | 7/1992 | Rando et al. | 235/487 |
| 5,420,406 | 5/1995 | Izawa et al. | 235/379 |

*Primary Examiner*—Harold Pitts
*Attorney, Agent, or Firm*—Francis L. Conte

[57] ABSTRACT

A method and system are disclosed for redeeming one or more coupons having an identifying barcode thereon for crediting against one or more products also having an identifying barcode thereon. The product and coupon are separately scanned at the barcodes thereof for identification. A scanned coupon is transported to a secure staging area to allow sequential scanning of additional coupons. The scanned coupon is compared with the scanned product to determine propriety of a credit thereagainst. The scanned coupon may be returned on demand, or credited against a scanned matching product when unreturned. The credited coupon is then secured for preventing unauthorized reuse. In a preferred embodiment, a plurality of the products and coupons may be scanned, with the scanned coupons being transported to the staging area for allowing return on demand of a selected one thereof.

20 Claims, 3 Drawing Sheets

METHOD AND SYSTEM FOR REDEEMING COUPONS

BACKGROUND OF THE INVENTION

The present invention relates generally to point of sale terminals, and, more specifically, to a cooperating system for redeeming coupons corresponding with purchased products.

Retail stores include one or more point of sale (POS) terminals at which products being purchased are tallied for obtaining a total price therefor. A typical terminal includes a barcode scanner which automatically reads a barcode affixed to the individual products. Barcodes have conventional forms, such as the Universal Product Code (UPC), which uniquely identifies the product to which it is attached. During the checkout procedure, the scanned barcodes are associated with a product inventory list maintained in a database for determining the prices of associated products.

Also during the checkout procedure, it is common to receive from a customer a redemption coupon having a monetary redemption value which may be used as a credit against a purchase of the corresponding product associated with the coupon. Such redemption coupons typically also include a corresponding barcode which identifies the product associated with the coupon and a monetary credit value therefor. The coupon barcode may be read by the same or dedicated barcode scanner at the terminal, with the terminal then comparing the scanned coupon against a list of purchased products. In the event of a match, the value of the coupon credit is applied against the total purchase price, and for non-matching coupons the clerk may simply return the coupon to the customer.

Although barcode scanning substantially improves the efficiency of handling products and coupons in a retail transaction, it nevertheless requires a certain amount of labor from a retail clerk. In order to further reduce the amount of labor required in the process, self-service checkout (SSCO) systems are being developed allowing individual customers to complete retail transactions with little or no aid from a clerk.

In a self service system, coupon redeeming presents its own set of problems. Coupons must be presented by a customer for scanning and comparing with the list of purchased products for determining any matches therebetween. Credited coupons must be secured within the system to prevent unallowed duplicate use thereof. And, since a customer may change his or her mind during the checkout process, individual coupons must be returnable upon demand by the customer.

Accordingly, an improved method and system are desired for scanning, accepting, and securing barcoded coupons with improved efficiency and minimizing or eliminating the need for clerk assistance.

SUMMARY OF THE INVENTION

A method and system are disclosed for redeeming one or more coupons having an identifying barcode thereon for crediting against one or more products also having an identifying barcode thereon. The product and coupon are separately scanned at the barcodes thereof for identification. A scanned coupon is transported to a secure staging area to allow sequential scanning of additional coupons. The scanned coupon is compared with the scanned product to determine propriety of a credit thereagainst. The scanned coupon may be returned on demand, or credited against a scanned matching product when unreturned. The credited coupon is then secured for preventing unauthorized reuse. In a preferred embodiment, a plurality of the products and coupons may be scanned, with the scanned coupons being transported to the staging area for allowing return on demand of a selected one thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
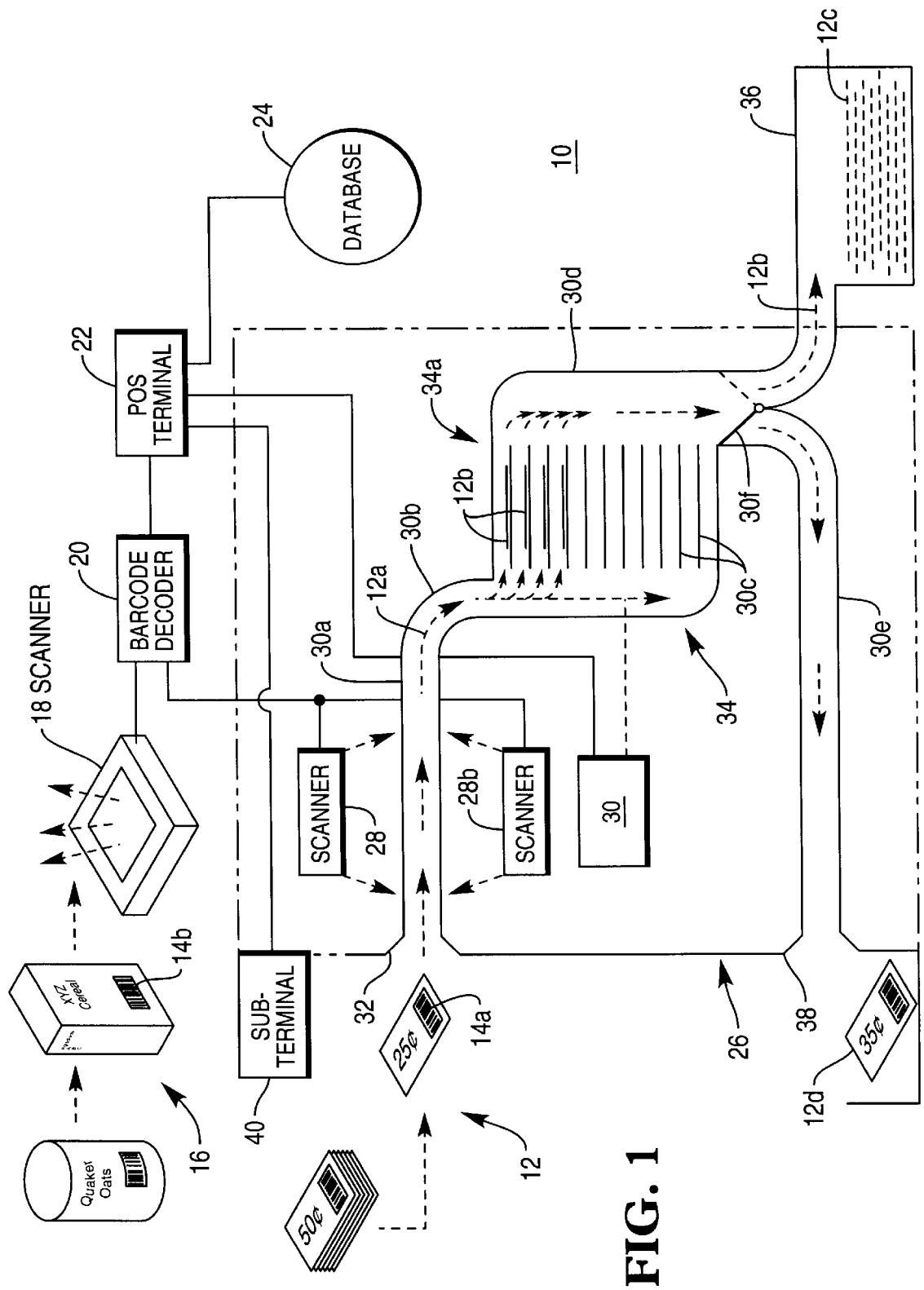
FIG. 1 is a schematic representation of a system for redeeming coupons against corresponding products in accordance with an exemplary embodiment of the present invention.

Illustrated schematically in FIG. 1 is an exemplary system 10 for practicing a method of redeeming one or more redemption coupons 12 having a conventional identifying barcode 14a thereon. Each coupon 12 corresponds with a predetermined one of several retail products 16, each having its own corresponding identifying barcode 14b thereon.

The individual products 16 may have any conventional form such as food or apparel items for example. Each product 16 has an associated purchase price therefor for sale in a retail establishment.

The coupons 12 may take various conventional forms and are typically associated with a single corresponding one of the products 16. The coupons 12 are typically provided for promoting sale of the corresponding product and have some monetary value which may be applied as a credit or refund against the purchase of the corresponding product. The term coupon as used herein applies not only to the typical monetary redemption coupon offered by product manufacturers in the retail industry, but also includes any other type of coupon for which a monetary or other credit against the purchase of products is desired. For example, Food Stamps are a type of coupon offered by the Government which may be used like currency to provide a credit against a purchase of selected items such as food. Such Food Stamps may also be identified by a bar code and redeemed in accordance with the present invention.

The barcodes 14a,b may take any conventional form such as the conventionally known Universal Product Code (UPC) barcodes having a series of alternating light and dark bars of varying width for coding any desired information. In the case of the products 16, the barcodes 14b identify the specific product to which they are attached. Similarly, the barcodes 14a for the coupons 12 identify an associated product and a monetary credit amount, and may also include an expiration date for the coupon.

In a conventional POS terminal, a clerk swipes the product and barcode over a barcode reader for providing a tally of the purchased products. The clerk then separately scans one or more coupons provided by the customer for matching the presented coupons against the purchased products. Matched and unexpired coupons are then credited against the total purchase price, with the so redeemed coupons then being retained by the clerk for subsequent further redemption from the individual manufacturers. Unmatched coupons are returned to the customer.

In accordance with the present invention, the system 10 illustrated in FIG. 1 is specifically configured for automating coupon redemption in the purchase of products, while minimizing the need for clerk assistance therefor. In one configuration, the system 10 may be configured as a fully self-service checkout system which allows individual customers to purchase one or more items and redeem associated coupons without the need for a clerk. Or, a clerk may be provided for scanning the products 16 and handling the required currency transaction, with the customer handling redemption of the coupons 12. Yet further, the clerk may handle both the products 16 and coupons 12 in the improved system 10.

The system 10 preferably includes means in the form of a conventional product barcode scanner 18 for scanning one or more of the presented products 16 at the corresponding barcodes 14b thereof to identify the specific product corresponding therewith. The product scanner 18 may take any conventional form such as that including a laser scanning beam reflected through suitable scanning optics for reflecting off the product barcode 14b, with the reflected scan beam being channeled through collection optics for detection. Associated with the scanner 18 is a conventional barcode decoder 20 which decodes the reflected scan beam for identifying the associated product 16.

The decoder 20 is operatively joined to a conventional point of sale (POS) terminal 22 which in turn is operatively connected to a conventional database 24. The scanner 18 and decoder 20 are typically associated with the terminal 22 in a common assembly at a remote site located at a checkout counter for example. A typical retail establishment may have several identical terminals 22 for simultaneously handling many customers together. The database 24 is typically a common database to which the several terminals 22 are operatively joined. The terminals 22 and database 24 conventionally use suitable digitally programmable computers and computer memory for providing all of the functions thereof in a conventionally known manner.

As the individual products 16 are scanned at the terminal 22, the product 16 is identified from its barcode 14b and the price thereof is determined in a corresponding price lookup table maintained in the database 24. The various products 16 being purchased by a customer are tallied by the terminal 22 which typically also includes a suitable visual display illustrating the tally of purchased items and their prices. Upon completion of the transaction, the total purchase price is presented by the terminal 22 for which suitable payment is made by the customer. Upon payment, the terminal 22 typically provides a written receipt tally of the purchased items using a conventional receipt printer therein.

In accordance with a preferred embodiment of the present invention, a coupon acceptor 26 is operatively joined to the terminal 22 for redeeming the coupons 12 against the products 16 purchased by a customer. The coupon accepted 26 may be formed in its own, dedicated housing with minimal operative or electrical connections with the main terminal 22, or may be integrated therewith in any suitable manner for providing the cooperating coupon redemption function.

Suitable means including a conventional barcode scanner 28 are provided for scanning the coupons 12 at the barcodes 14a thereof for identifying the respective coupons 12. The coupon scanner 28 may take any conventional form like the product scanner 18, and may be substantially identical thereto, or may even use the product scanner 18 itself if desired in an integrated system. The coupon scanner 28 is similarly operatively joined to the same or similar barcode decoder 20 either in an integrated decoder, or as a separate decoder if desired.

The coupon scanner 28 is in turn also operatively joined to the terminal 22 which suitably controls the operation thereof and the redemption of the coupons 12 as credits against the products 16 being purchased. In a typical example, the barcode 14a of the individual coupons 12 identifies the product associated therewith for which a monetary credit may be obtained, with the barcode 14a also including the amount of the monetary credit. Other information, such as expiration date, may also be contained in the barcode 14a if desired.

Suitable means 30 are provided for automatically transporting the individual coupons 12 as they are presented sequentially to an insertion slot or inlet port 32 from which they are conveyed to the scanning region of the scanner 28. The transporting means 30 may take any conventional form including a series of opposed driving wheels which grip and carry along the coupons 12 in any desired path. Conveyor belt or other systems may also be used for suitably transporting the coupons 12 in a manner similar to conventional systems for transporting paper money, for example, in automatic teller machines (ATM), vending machines, or money changers, for example. The transporting means 30 preferably also includes various conventional sensors, such as optical sensors, for tracking the location of the individual coupons 12 along the transporting path.

The transporting means 30 preferably include various stages, with a first stage designated 30a being provided from the insertion slot 32 and past the coupon scanner 28. The first transport stage 30a is effective for initially receiving the individual coupons 12 and carrying them forward to the scanner 28 for reading the barcodes 14a thereon. After a predetermined time interval for scanning the coupon 12, the first stage 30a continues to transport in the forward direction for a successful scan, or reverses direction to reject the coupon 12 out the insertion slot 32 for an unsuccessful scan.

The transporting means 30 also includes a second stage 30b which automatically transports a successfully scanned coupon, designated 12a, to a temporary secure holding or staging area 34a to allow sequential scanning of one or more additional coupons 12 immediately thereafter. In this way, a scanned coupon 12a is removed from the first stage 30a under the scanner 28 so that the next coupon 12 may be moved into position under the scanner 28 without interference from the previously read coupon.

Suitable means are provided for comparing the scanned coupon 12a with one or more of the scanned products 16 to designate or determine the propriety or authorization of a monetary credit thereagainst. The comparing means are conventionally effected in the terminal 22 itself by having suitable software specifically configured therefor. As the individual products 16 are scanned across the product scanner 18, a list thereof is suitably maintained in terminal memory so that as the coupons 12 are scanned they may be compared against the list of purchased products 16 for determining whether or not matches have been made. If a specific coupon 12 is unmatched in the comparison against the purchased products 16, a no-match designation is made indicating that no credit for the coupon may be received, and then the unmatched coupon may be suitably rejected and returned to the customer as described hereinbelow. In the event of a match between the scanned coupon 12a and one or more of the scanned products 16, a match designation is made authorizing a credit therefor in the amount read from the scanned coupon 12a.

Figure 2:
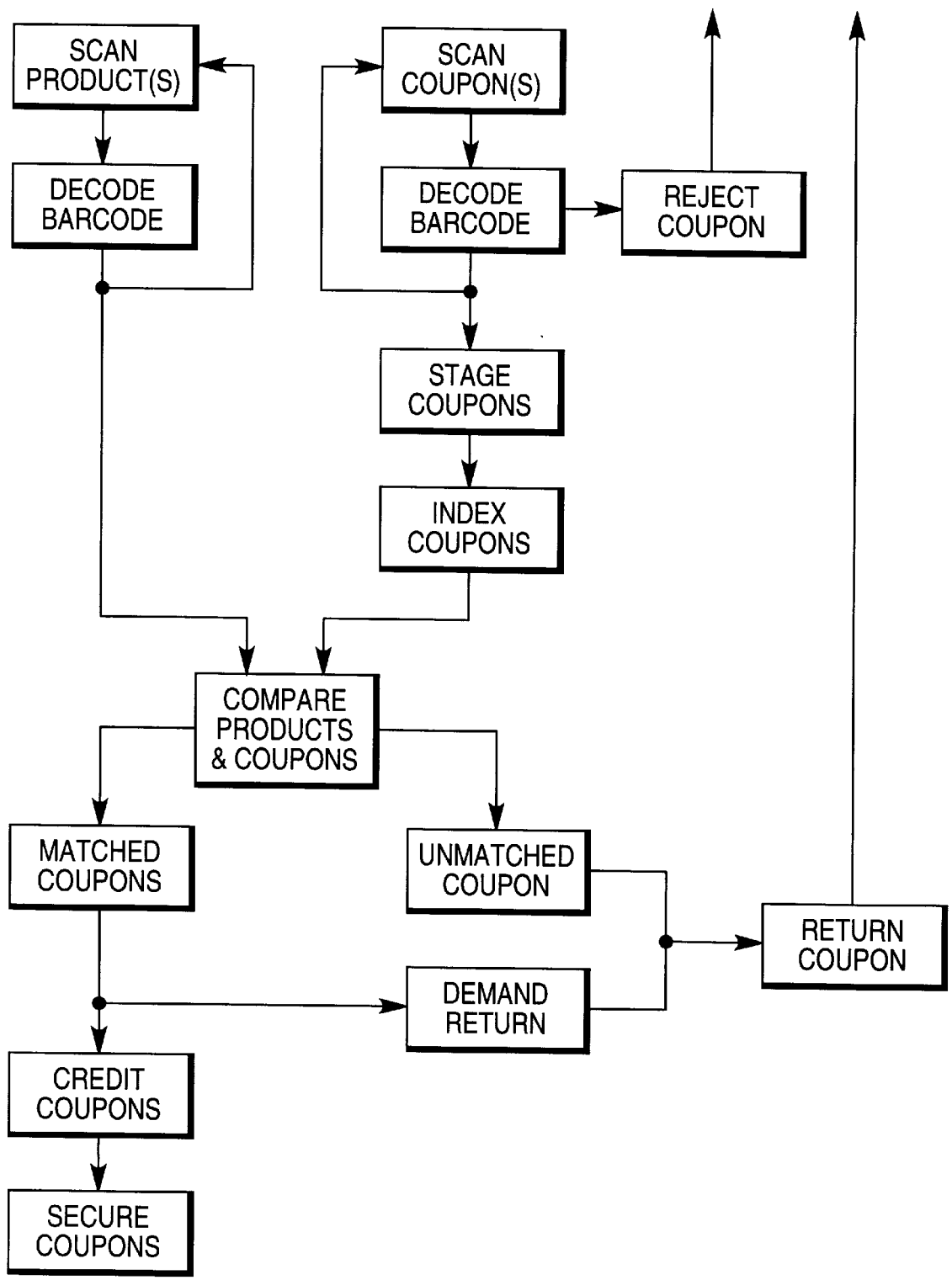
FIG. 2 is a flowchart of an exemplary method of redeeming the coupons against the corresponding products corresponding with the system illustrated in FIG. 2.

In a typical retail transaction such as in purchasing grocery items in a food store, substantially more than one product 16 is purchased, and typically more than one coupon 12 is presented for redemption. Accordingly, the redemption system illustrated in FIG. 1 may be used to advantage for practicing an improved method presented in an exemplary sequence in the flowchart of FIG. 2. The method includes sequentially scanning a plurality of the products 16 at the corresponding barcodes 14b thereof to identify the corresponding products associated therewith.

Upon presentation of a plurality of the coupons 12, they are sequentially scanned at the corresponding barcodes 14a thereof to identify the coupons. The coupons 12 are individually and sequentially presented in the insertion slot 32 and sequentially transported by the first transport stage 30a to the scanner 28 for the reading thereof. Successfully scanned coupons 12a are then transported by the second stage 30b to the staging area 34a. The terminal 22 then automatically compares the list of scanned coupons 12a with all the scanned products 16 to determine the propriety of corresponding credits thereagainst.

The coupon acceptor 26 preferably comprises a secure housing so that once the coupons 12 are inserted therein they are not accessible by the customer. However, customers may choose for various reasons to withdraw a specific product or coupon from the transaction process which must be readily permitted. The method, therefore, preferably also includes the step of returning to the customer on demand any one of the scanned coupons 12a prior to completion of the transaction process and final crediting of the coupon against the product. For example, the customer may choose to return a specific product or item for which the product and coupon have already been scanned. Not only must the product be removed from the transaction list, but the coupon itself must also be returned without crediting the transaction.

A single coupon 12 presented for redemption may be easily returned out the insertion slot 32 using the same rejection mechanism found in the coupon acceptor. However, where multiple coupons 12 have been scanned and transported inside the acceptor, suitable means must be provided for returning selected ones of the scanned coupons on demand without obstruction from the other coupons. In addition, the ability to return on demand a selected matched one of the scanned coupons 12a is required even though it has already been successfully matched to one of the scanned products. Furthermore, any scanned coupon 12a remaining unmatched after all the products 16 have been scanned, must also be returned to the customer. The transaction process is completed by crediting against the scanned products 16 all remaining unreturned and matched scanned coupons 12a.

In order to return any selected one of the scanned coupons 12a from the staging area 34a, the individual scanned coupons 12a must be uniquely staged or indexed to identify and locate individual ones thereof. Accordingly, means 34 are provided for staging or indexing the several scanned coupons 12a at the staging area 34a to locate individual ones thereof. In the exemplary embodiment illustrated in FIG. 1, the indexing means 34 include a plurality of holding bins which define the staging area 34a for staging therein respective ones of the indexed coupons, designated 12b. The individual staging bins 34a which define the staging areas, may be vertically stacked in a compact arrangement as illustrated in FIG. 1, although other configurations thereof may be used.

The second transport stage 30b may be suitably configured to transport the individual scanned coupons 12a into respective ones of the staging bins 34a in preferably a one-to-one correspondence to temporarily hold solely one indexed coupon 12b in a respective staging bin 34a. The second stage 30b may therefore include conventional deflecting gates for redirecting each of the scanned coupons 12a into a corresponding one of the staging bins 34a.

In the exemplary embodiment illustrated in FIG. 1, each of the staging bins 34a includes an inlet on one side in flow communication with the second stage 30b, and also includes an outlet on an opposite side. A third stage 30c of the transporting means 30 is suitably configured for cooperation with each of the staging bins 34a to selectively and individually eject the indexed coupons 12b through their outlets into a cooperating fourth stage 30d of the transporting means. The fourth stage 30d is effective for sequentially transporting the individual indexed coupons 12b to a secured storage bin 36 which stores all redeemed or credited coupons, designated 12c, for preventing their unauthorized reuse.

In order to return on demand a selected one of the indexed coupons 12b, the transporting means 30 may be further configured with a fifth stage 30e which is joined in flow communication between the fourth stage 30d and a return slot or port 38 having a suitable tray for receiving returned coupons, designated 12d. A suitable gate 30f may be disposed at the junction of the fourth and fifth transport stages 30d and 30e for either directing the indexed coupons 12b into the storage bin 36 or along the fifth stage 30e to the return slot 38 for return to the customer.

Once the individual indexed coupons 12b are placed in their respective staging bins 34a any one thereof may be selectively removed. Suitable sensors, such as optical sensors, indicate the presence of an individual indexed coupon 12b in one of the corresponding staging bins 34a, with the identity and location of the indexed coupons 12b being suitably maintained in memory in the main terminal 22. In the event of an unmatched indexed coupon 12b, or for a matched indexed coupon 12b for which a customer has demanded return, the respective transport stages 30c,d,e are actuated by the main terminal 22 to return the coupon to the return slot 38. Any one of the staging bins 34a may be addressed in this manner for returning any one of the indexed coupons 12b to the return slot 38. Any returned coupon 12d is thusly removed from the stack of indexed coupons 12b and is no longer available for crediting against the products 16 purchased.

In the exemplary embodiment illustrated in FIG. 1, the indexed coupons 12b are staged in independent, respective staging bins 34a, and are separately removable therefrom for return on demand, as well as for crediting and securing thereof in the storage bin 36. In an alternate embodiment of the invention (not shown), the individual indexed coupons 12b may be simply stacked atop each other, and may be conventionally shuffled for removing any individual one thereof from the stack.

In order to improve the ease of use of the coupon acceptor 26 illustrated in FIG. 1, it preferably includes a pair of barcode scanners spaced apart on opposite sides of the first transport stage 30a. The first barcode scanner 28 is disposed above the first stage 30a for scanning the top or face-up orientation of the inserted coupon 12. A second barcode scanner 28b is disposed below the first stage 30a for scanning a face-down orientation of the barcodes 12.

In a preferred sequence of operation, the several coupons 12 may be sequentially presented and scanned at any time during scanning of the products 16. The scanned coupons 12a are then compared with the scanned products 16 after all of the products have been scanned.

Figure 3:
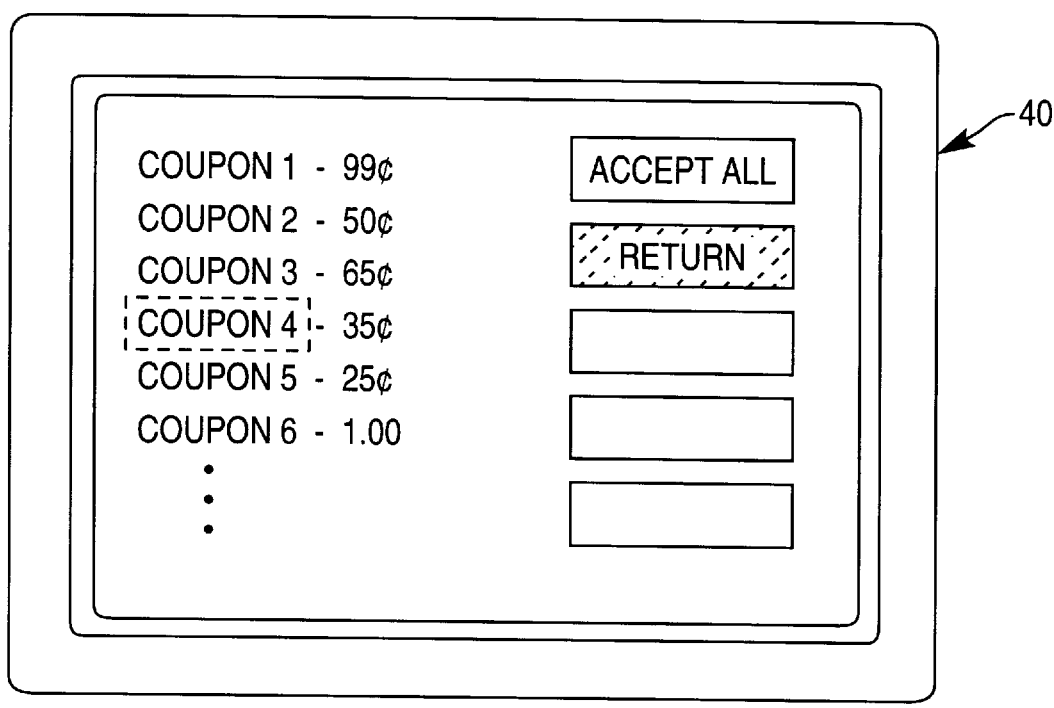
FIG. 3 is a front view of an exemplary sub-terminal having a visual display for listing scanned coupons for acceptance thereof, or for return of selected ones thereof on demand.

The coupon acceptor 26 as illustrated in FIG. 1 may include its own dedicated sub-terminal 40 which is operatively joined to the main terminal 22. The sub-terminal 40 may take any conventional form including a touchscreen display as illustrated in FIG. 3. In this way, the touchscreen 40 provides means for displaying a list of the indexed coupons 12b held in the staging area 34a from which the customer may either accept all or some thereof when matches have been made with the scanned products. An unmatched indexed coupon 12b may be listed and so designated for being rejected and returned to the return slot 38 either immediately upon detection or subsequently after prompted from the touchscreen 40. The touchscreen 40 may therefore list not only matched coupons, but unmatched coupons for which no credit will be given.

The touchscreen 40 as illustrated in FIG. 3 may have any suitable control options or buttons for accepting all of the coupons and allowing the transaction to be finally completed. Or, any one of the displayed coupons may be suitably highlighted and returned on demand, with the remainder thereof being finally redeemed as desired.

If desired, the touchscreen 40 may be used to prompt the customer to insert individual coupons for redemption; return selected coupons; and accept the remaining coupon list for final redemption and credit against the products being purchased.

As indicated above, the system 10 may be implemented in various forms and controlled by suitable software to enjoy the various benefits thereof. The staging means 34 may take any suitable form wherein the individual coupons are indexed so that selected ones may be returned on demand. The resulting system therefore provides additional benefits in improving coupon redemption at point of sale terminals.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A method of redeeming a coupon having an identifying barcode thereon comprising:

scanning a product at a barcode thereof to identify said product corresponding therewith;

scanning said coupon at said barcode thereof to identify said coupon;

transporting said scanned coupon to a secure staging area to allow sequential scanning of additional coupons;

returning on demand said scanned coupon;

comparing said scanned coupon with said scanned product to determine propriety of a credit thereagainst;

crediting against said scanned product a matching scanned coupon; and securing said credited coupon.

2. A method according to claim 1 further comprising:

sequentially scanning a plurality of products to identify products corresponding therewith;

sequentially scanning a plurality of coupons to identify said coupons;

sequentially transporting said scanned coupons to said staging area;

comparing said scanned coupons with said scanned products to determine propriety of credits thereagainst;

returning on demand a selected one of said scanned coupons; and crediting against said scanned products unreturned matching scanned coupons.

3. A method according to claim 2 further comprising:

indexing said scanned coupons at said staging area to locate individual ones thereof; and removing from said indexed coupons said selected coupon for return.

4. A method according to claim 3 wherein said indexed coupons are stacked, and said return coupon is removed therefrom.

5. A method according to claim 3 wherein said indexed coupons are staged in independent, respective staging bins, and are separately removable therefrom for return on demand, and for crediting and securing thereof.

6. A method according to claim 3 further comprising scanning opposite sides of said coupon for decoding said coupon in a face-up or face-down orientation.

7. A method according to claim 3 further comprising rejecting said scanned coupon when unmatched in a no-credit comparison.

8. A method according to claim 3 further comprising:

sequentially presenting and scanning all said coupons at any time during scanning of said products; and comparing said coupons and products after scanning all said products.

9. A method according to claim 3 further comprising:

displaying a list of said indexed coupons held in said staging area; and designating from said list said return coupon.

10. A method according to claim 3 wherein said credited coupons are secured in a storage bin.

11. A system for redeeming a coupon having an identifying barcode thereon comprising:

means for scanning a product at a barcode thereof to identify said product corresponding therewith;

means for scanning said coupon at said barcode thereof to identify said coupon;

means for transporting said scanned coupon to a secure staging area to allow sequential scanning of additional coupons; wherein said transporting means are also configured for returning on demand said scanned coupon;

means for comparing said scanned coupon with said scanned product to determine propriety of a credit thereagainst;

means for crediting against said scanned product a matching scanned coupon; and means for securing said credited coupon.

12. A system according to claim 11 wherein:

said product scanning means are effective for sequentially scanning a plurality of products to identify products corresponding therewith;

said coupon scanning means are effective for sequentially scanning a plurality of coupons to identify said coupons;

said transporting means are effective for sequentially transporting said scanned coupons to said staging area; and wherein said transporting means are further configured for returning on demand a selected one of said scanned coupons.

13. A system according to claim 12 further comprising means for indexing said scanned coupons at said staging area to locate individual ones thereof; and means for removing from said indexed coupons said selected coupon for return.

14. A system according to claim 13 wherein said indexing means are effective for stacking said indexed coupons to remove said return coupon therefrom.

15. A system according to claim 14 wherein said indexing means comprise a plurality of staging bins for holding respective ones of said indexed coupons for return on demand.

16. A system according to claim 15 wherein said scanning means comprise a pair of barcode scanners spaced apart for scanning opposite sides of said coupon for decoding said coupon in a face-up or face-down orientation.

17. A system according to claim 16 further comprising means for displaying a list of said indexed coupons held in said staging area; and being effective also for designating from said list said return coupon.

18. A method according to claim 1 further comprising automatically transporting said scanned coupon to said secure staging area to allow sequential scanning of said additional coupons.

19. A method according to claim 1 further comprising transporting by apparatus said scanned coupon to said secure staging area to allow sequential scanning of said additional coupons without clerk assistance.

20. A method according to claim 11 wherein said transporting means are effective for automatically transporting said scanned coupon to said secure staging area to allow sequential scanning of said additional coupons.

* * * * *